June 11, 1968 E. E. ROTH ET AL 3,387,718
PALLET LOADING AND UNLOADING APPARATUS
Filed March 10, 1966 6 Sheets-Sheet 2

INVENTORS:
ERNEST E. ROTH
HENRY E. TANNER
BY Gravely, Lieder & Woodruff
ATTORNEYS.

June 11, 1968 E. E. ROTH ET AL 3,387,718
PALLET LOADING AND UNLOADING APPARATUS
Filed March 10, 1966 6 Sheets-Sheet 4

INVENTORS:
ERNEST E. ROTH
HENRY E. TANNER
BY Gravely, Lieder & Woodruff
ATTORNEYS.

June 11, 1968  E. E. ROTH ET AL  3,387,718
PALLET LOADING AND UNLOADING APPARATUS
Filed March 10, 1966  6 Sheets-Sheet 5

INVENTORS:
ERNEST E. ROTH
HENRY E. TANNER
BY Gravely, Lieder & Woodruff
ATTORNEYS June 11, 1968  E. E. ROTH ET AL  3,387,718
PALLET LOADING AND UNLOADING APPARATUS
Filed March 10, 1966  6 Sheets-Sheet 6

INVENTORS:
ERNEST E. ROTH
HENRY E. TANNER
BY Gravely, Lieder & Woodruff
ATTORNEYS.

United States Patent Office 3,387,718
Patented June 11, 1968

3,387,718
PALLET LOADING AND UNLOADING
APPARATUS
Ernest E. Roth, Arnold, and Henry E. Tanner, Affton, Mo., assignors to Alvey Conveyor Manufacturing Company, St. Louis, Mo., a corporation of Missouri
Filed Mar. 10, 1966, Ser. No. 533,571
10 Claims. (Cl. 214—1)

This invention relates to apparatus for loading and unloading pallets which support multiple layers or tiers of articles, such as packages, boxes, cases for beverages, and other articles to be handled in rigid or semi-rigid containers of wood, paperboard or fibre materials.

A problem in the mass handling of articles which are transported from place to place on pallets is that the present type of apparatus are complicated, require skill in manufacture, are expensive to maintain, and use up excessive floor area. There are certain types of apparatus which clamp articles in groups for handling, but only substantially rigid articles are capable of being clamped without damage. Other types of apparatus make use of suction or vacuum devices as the principal means for holding articles during handling or movement from place to place.

An important object of the present invention is to provide pallet loading and unloading apparatus of simple construction and operation, which is inexpensive to manufacture, requires no special skill to use and may be usefully applied in a wide range of commercial activities where articles are to be handled in volume.

Another important object of the present invention is to provide an article handling unit for apparatus of the present class in which the unit is able by suction and pressure means to rapidly compact a layer or tier of articles and lift and transport the articles from place to place.

It is also an object of this invention to provide a novel and useful article handling unit in which both suction and pressure are combined to expedite handling of articles of a semi-rigid nature and avoid damage thereto.

A further object of the present invention is to provide simple apparatus utilizing the capabilities of the aforesaid article handling unit for palletizing as well as depalletizing articles.

Additional objects of the present invention reside in the components, parts, combinations of components and parts, and the application thereof in and to commercial apparatus.

Certain presently preferred forms of this invention are hereinafter disclosed and described, reference being made in this specification to the accompanying drawings, wherein.

Figures 1, 5:
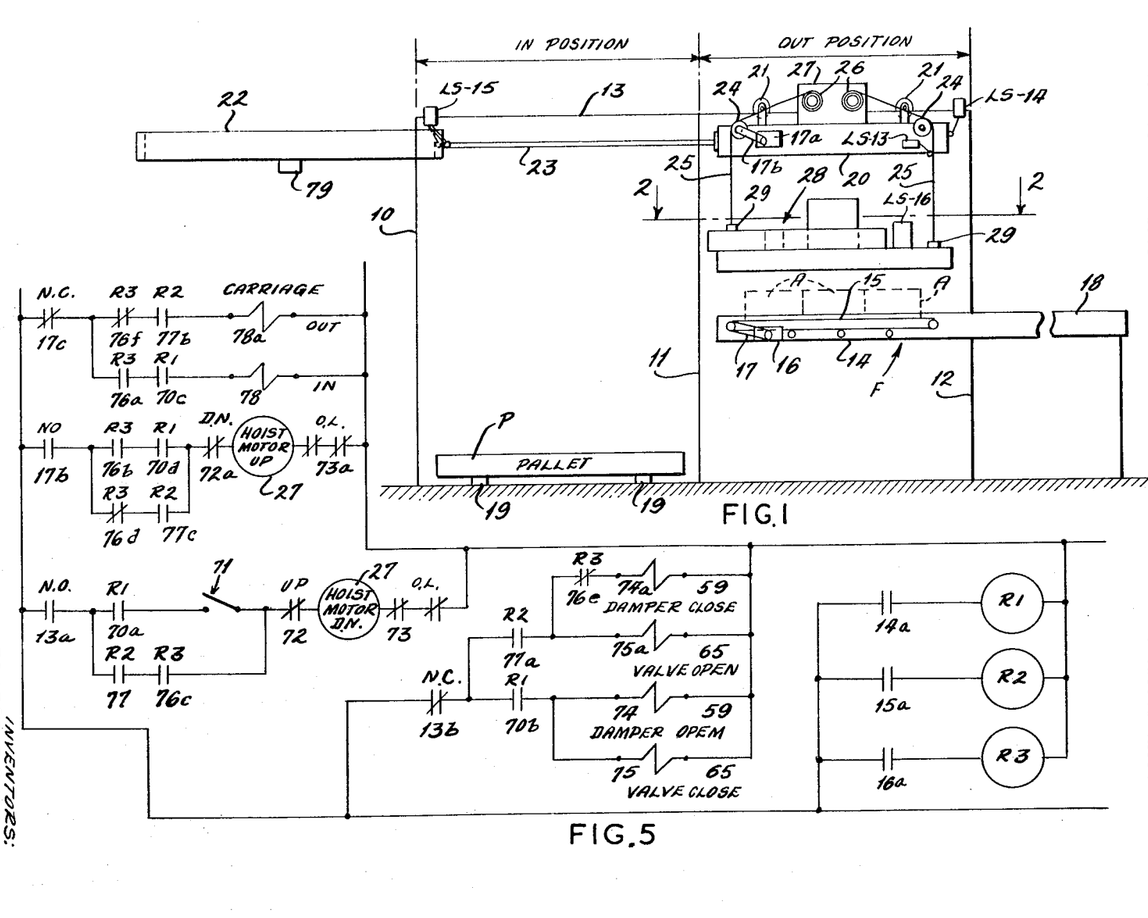
FIG. 1 is a schematic elevational view of pallet loading and unloading apparatus which shows certain aspects of the present invention.
FIG. 5 is a wiring diagram for the apparatus of FIG. 1.

Turning now to FIG. 1 the apparatus is schematically shown to simplify the following description. The frame for the apparatus includes pairs of vertical members 10, 11 and 12 spaced apart to form a rigid skeleton for supporting a pair of overhead rails 13. Within the space between members 11 and 12 there is mounted a suitable frame F having a pair of spaced side members 14 between which are mounted the articles A on a belt 15 reversibly powered by motor 16 driving a roller sprocket chain 17. The articles A are brought to or taken away from the apparatus by conveyor means 18 of any suitable type. When means 18 is used for bringing articles A to the apparatus the articles are formed (by means not necessary to show) into a layer having a desired pattern and then moved onto the belt 15. When means 18 is used for taking articles A away the entire layer is moved off by belt 15 and dispersed by means 18.

Within the space between vertical members 10 and 11 there are positioned a pair of fixed rails 19 to support a pallet P above the level of the floor so that the pallet P may be deposited upon or removed from the rails 19 by a fork lift truck. The pallet P may be deposited on rails 19 fully stacked with layers of articles A or it may initially be empty for receiving multiple layers of articles.

The apparatus of FIG. 1 includes a carriage structure 20 having flanged rollers 21 engaged on the elevated rails 13. A fluid pressure motor 22 is attached to the frame members 10 so that its elongated rod 23 can be connected to the carriage 20 for causing the carriage to move from the position shown between members 11 and 12 to a position between members 10 and 11. The first position shall be designated the "OUT" position, and the second mentioned position shall be designated the "IN" position, both taken in relation to whether the rod 23 is extended or retracted respectively.

The carriage 20 is provided with a plurality of pulleys 24 to guide a system of cables 25 which are wound upon drums 26 rotated by a motor and gear unit 27. The cable system 25 is used to suspend an article handling unit 28 by suitable cable connectors 29 over the fixed frame F. The unit 28 is lowered to or lifted from frame F by the motor unit 27, and the carriage 20 together with the unit 28 is moved to its IN or OUT positions, as is now understood.

Figure 2:
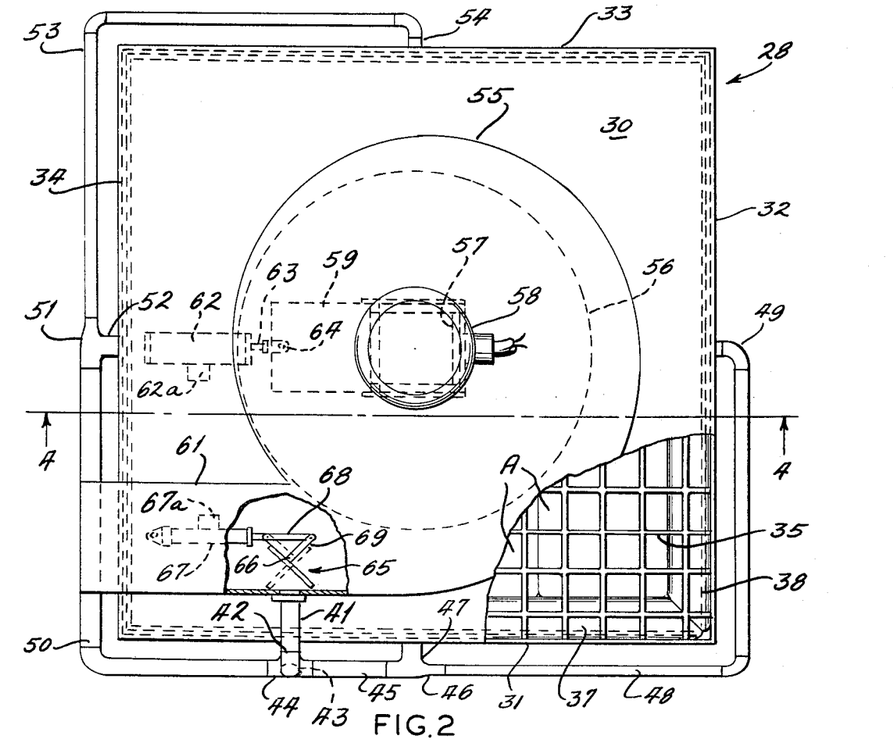
FIG. 2 is a top plan view, partly in broken section, of the article handling unit of the apparatus as seen at line 2—2 in FIG. 1.
Figure 3:
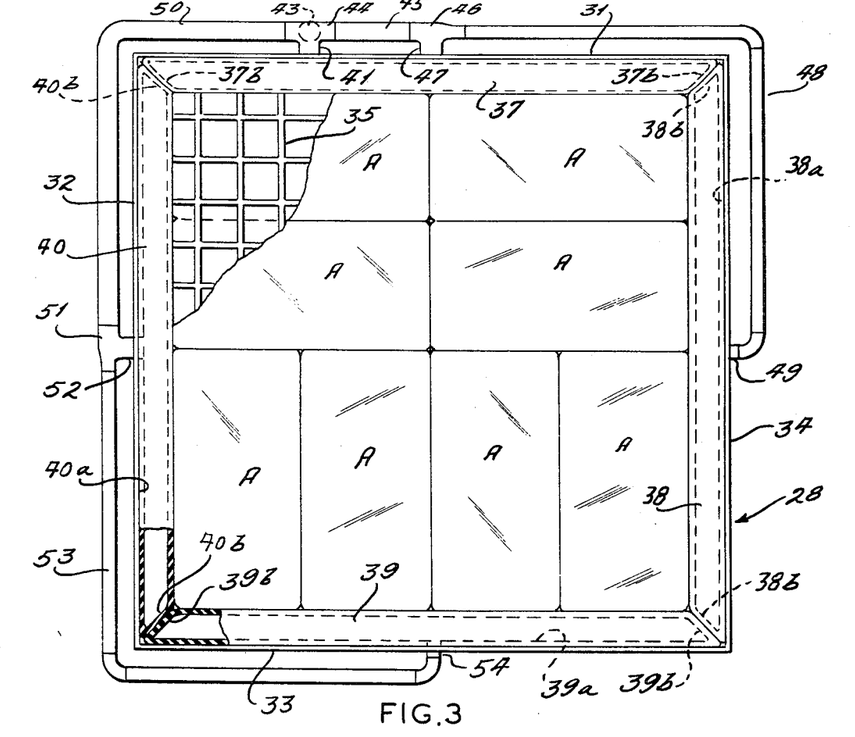
FIG. 3 is a bottom plan view of the unit of FIG. 2.
Figure 4:
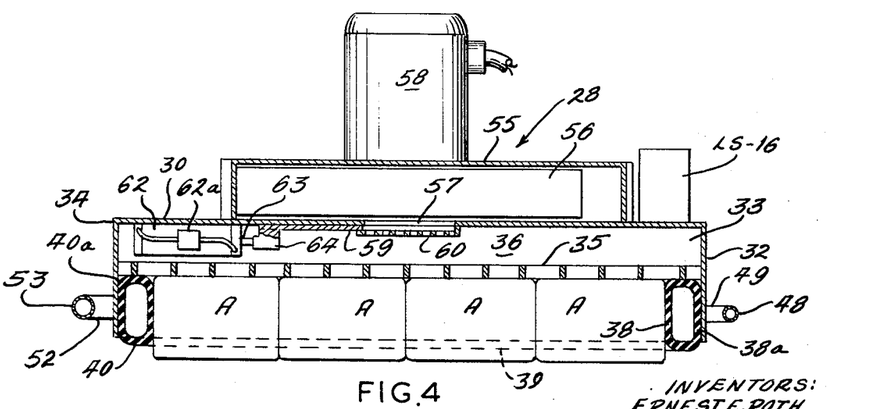
FIG. 4 is a cross sectional view taken at line 4—4 in FIG. 2 showing inflatable members in the unit.

The article handling unit 28 is best seen in FIGS. 2, 3 and 4. The unit includes a rigid frame having a top wall 30 of rectangular shape and depending side walls 31, 32, 33 and 34, which together form a shallow box structure. An open grid structure 35 is secured within the side walls and spaced from the top wall 30 to form a space 36 between the top wall 30 and grid 35. The grid 35 and the side walls 31 to 34 together form an enclosed space to receive articles A to be handled, the articles engaging the grid 35, but being spaced from the side walls 31 to 34.

Means in unit 28 to compact and grip the articles A, in whatever pattern the layer may have, comprises a plurality of inflatable members 37, 38, 39 and 40. Each inflatable member is attached by its back wall 37a, 38a, 39a and 40a to the surface of the adjacent depending side wall 31, 32, 33 and 34 respectively. This mounting allows the inflatable members to expand inwardly from the side walls (FIGS. 3 and 4), and the closed ends 37b, 38b and 40b of the members also expand so that the adjacent ends (FIG. 3) move into abutment to form miter joints at the respective corners. The inflatable members are connected to a pressure fluid system which comprises (FIGS. 2 and 3) a supply inlet 41 leading to an elbow fitting 42 and nipple 43, and into a T fitting 44. One branch of the T fitting 44 connects to a conduit 45 having a T fitting 46 thereon which connects through branch 47 to the inflatable member 37. Another branch of T fitting 46 is connected to a reduced diameter conduit 48 which leads to the inlet fitting 49 connected to inflatable member 38. The opposite branch of the T fitting 44 is connected by conduit 50 to a T fitting 51, one branch of which connects through nipple 52 to inflatable member. A reduced diameter conduit 53 leads from the other branch of T fitting 51 to an inlet fitting 54 for inflatable member 39.

Figure 4A:
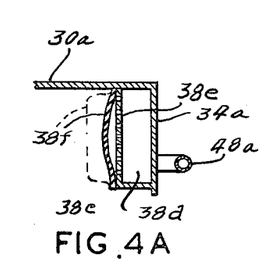
FIG. 4A is a fragmentary sectional view of modified inflatable means for the unit of FIG. 3.

The modification shown in FIG. 4A is representative of all sides of the unit 28. As shown the side 34a depending from top 30a has a rigid wall member 38c positioned to form a pressure fluid receiving chamber or plenum 38d in which wall 38e is perforated. There is a flexible member 38f secured at its margins to the wall 38e so that a seal is effected which will allow the pressure fluid to extend the wall 38f to perform as does the inflatable member 38. Seals at the respective corners are formed in substantially the manner shown in FIG. 3 or as will appear in FIG. 6.

The unit 28 includes a blower having the casing 55 secured on the top wall 30 with the eye of the impeller 56 aligned with an inlet opening 57 in such top wall 30. The impeller 56 is driven by motor 58, and a slide valve 59 (FIG. 2 and 3) on the inner side of top wall 30 controls the inlet 57. A protective screen 60 is mounted over the opening to protect the impeller 56. The impeller volute housing 55 has an outlet or discharge conduit 61 open to atmosphere. The impeller thus draws air from the space 36 above grid 35 (FIG. 4) and when a layer of articles A is present, and the inflatable members 37, 38, 39 and 40 are inflated to seal off the periphery of the layer, and concurrently push the articles into a compact arrangement to substantially reduce air flow past the articles, the space 36 will be evacuated to increase the pressure drop across the layer of articles.

The blower inlet 57 has its slide valve 59 moved by a pressure fluid motor 62 attached to the top wall 30 in space 36. The actuating rod 63 is connected to the slide valve 59 by means 64. The supply of air for inflating the members 37, 38, 39 and 40 is obtained by tapping the inlet 41 into the blower discharge conduit 61 (FIG. 2) where the air is under pressure. The inlet 41 is controlled by a flip-flop valve 65 on pivot shaft 66. The valve 65 is actuated by a pressure fluid motor 67 with its rod 68 connected to a crank arm 69 on the shaft 66. In the full line position of FIG. 2 the valve 65 is in the deflation position where blower air flows past the valve to suck the air out of conduit 41 and the inflated members 37, 38, 39 and 40. When the valve 65 is in its dotted line position the blower air is forced into conduit 41 and the connected conduit system to inflate the members 37, 38, 39 and 40.

Figure 2A:
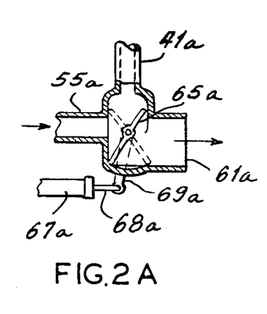
FIG. 2A is a fragmentary view of an alternate component for use in the unit of FIG. 2.

In FIG. 2A the modified means to replace valve 65 and conduit 41 and thereby not rely upon the blower 55 consists of a valve 65a in a suitable housing to which the conduit 41a is connected in place of going to the blower discharge 61. The housing has a pressure fluid inlet 55a connected to any convenient source of fluid, and an outlet 61a to atmosphere. The valve 65a is moved between two positions by arm 69a connected to the rod 68a of a pressure fluid motor 67a. In the full line position of valve 65a the members 37 to 40 are inflated, and in the dotted line position these same members are rapidly deflated or collapsed by the aspirating effect of the valve 65a.

FIGS. 1 and 5 show jointly a control circuit which will cause the apparatus to operate. It is noted that limit switch LS 14 is located to be closed by the carriage 20 when in its OUT position and limit switch LS 15 is located to be closed when the carriage 20 is in its IN position. These two limit switches when closed energize relays R-1 and R-2 respectively by closing contact 14a for R-1 and by closing contact 15a for R-2. Contacts 14a and 15a are normally open, and only one at a time is closed so that R-1 and R-2 are alternately energized. A limit switch LS 16 on the top of unit 28 is sensitive to the decrease of pressure below atmospheric in space 36. The limit switch LS 16 has a normally open contact 16a which when closed energizes a relay R-3. This relay R-3 and the other relays R-1 and R-2 are provided with circuit controlling contacts, all as will appear presently in the description of FIG. 5. In addition to a limit switch LS 13 is positioned to be responsive to the cable 25 so that it closes a normally open contact 13a when there is load holding cable 25 tight and it opens a normally closed contact 13b when the cable 25 goes slack as upon releasing the load or having the weight of unit 28 taken up by resting it on a layer of articles A.

Assuming that the carriage 20 is in its OUT position and has closed normally open contact 14a in circuit with relay R-1, this energizes the relay R-1 to close contact 70a in circuit with contact 13a of LS 13 which contact 13a is closed due to the weight of unit 28 on the cables. Thus a circuit will be completed through contacts 13a and 70a to the manually operated start button contact 71, and thence to the hoist motor 27 which rotates drums 26 to unwind cables 25 for lowering unit 28. The hoist motor 27 has an auxiliary contact 72 to protect it against receiving a signal reversing its rotation. The motor is also protected by overload means 73. Similarly the motor 27 has auxiliary contacts 72a and 73a which protect it against reverse signals while raising the unit 28.

The unit 28 lowers until it rests by the grid 35 (FIG. 4) on the top of the layer of articles A, at which time the cables 25 go slack and LS 13 and contact 13a opens and contact 13b closes. Opening contact 13a stops the down action of hoist motor 27, and closing contact 13b initiates a circuit through closed contact 70b of R-1, whereupon the blower damper solenoid 74 is energized to shift valve 62a to admit pressure fluid to motor means 62 for opening damper 59, and the solenoid 75 is energized to shift a valve 67a to admit pressure fluid to motor means 67 for valve 65. The action of these motors 62 and 67 is to have the blower exhaust air from the space 36, and to position the valve 65 so that air under pressure inflates the members 37 to 40. These two actions progress nearly at the same time so that as inflation of members 37 to 40 compact the articles A and a peripheral seal is established to enhance the suction effect of the blower. After a predetermined lowering of the pressure in space 36, which increases the drop of pressure between the ambient air and space 36, the articles are ready for lifting as a layer.

At this time a pressure sensitive limit switch LS 16 will close its normally open contact 16a to energize relay R-3. Relay R-3 will condition a carriage translation circuit through the action of a suitable control cam device 17a driven by belt 17b from pulley 24. This circuit includes normally closed contact 17c, normally open contact 76a of R-3, normally open contact 70c of R-1 and a solenoid 78 which shifts a valve 79 at motor 22.

The control cam device 17a, due to the travel of the cables 25, has a cam rotor which controls contacts 17c and 17d. The device 17a is commercially available and is therefore not shown in detail. Its function is to control movement of rod 23. Before carriage 20 begins its IN movement, the device 17a must close contact 17d to complete a circuit through contacts 76b and 70d to the hoist motor 27 to lift the unit 28 a predetermined distance above the means F. The thus completed circuit causes hoist motor 27 to reverse and lift unit 28 which tightens up on cables 25 to close contact 13a of LS13 and open contact 13b of LS 13. Reclosing of contact 13a and having contact 70a of R–1 closed will not affect the up operation of hoist motor 27 because the manual button 71 is open. It is noted that the by-pass circuit is open due to contact 77 of R–2 being open.

Thus, the unit 28 is hoisted up until relay LS 17 is actuated by cam travel to stop hoist motor 27 and signal the motor means 22 to move carriage 20 to its IN position. This is possible because contact 17c closes to complete a circuit through contact 76a which has been closed by R–3 (normally closed contact 76b being opened at this time) and contact 70c which has been closed by R–1. The solenoid 78 will reverse the valve 79 for motor means 22 to move carriage 20 leftwardly to the IN position, and as it leaves the OUT position it will allow LS 14 to restore contact 14a to normally open position which de-energizes R–1 to break the circuit to solenoid 78. As the motor means 22 brings carriage 20 to its IN position it will actuate limit switch LS 15 to close contact 15a and energize relay R–2. Relay R–2 will then close contact 77c, and since contact 76b of R–3 is opened and contact 76c is closed, a circuit is completed to the hoist motor 27 to run it in the direction to lower the unit 28. As the unit 28 reaches pallet P the cables 25 will go slack, thus actuating LS 13 to open contact 13a and close normally closed contact 13b.

At this point in the operation, the circuit is made through contact 13b, and contact 77a to reversing solenoid 75a for valve 65 to actuate motor means 67 and move the value to the full line position (FIG. 2) for deflating the members 37 to 40. This action decreases the vacuum condition and LS 16 responds by opening contact 16a to de-energize relay R–3 which allows contact 76e to close and make a circuit to reversing solenoid 74a for motor means 62 which closes damper 59 and cuts off the suction effect of the blower in space 36. At the same time normally closed contact 76f and contact 77b will set up a circuit to the reversing solenoid 78a for motor means 22 to prepare to move carriage 20 to its OUT position on the next cycle. As the vacuum sensitive limit switch LS 16 returns to its open position the R–3 contacts 76b and 76d will return to normal positions in which contact 76d is closed. A circuit is now made from contact 17d through contact 76d and contact 77c, which is closed due to LS 15 being closed by the carriage 20, to hoist motor 27 causing it to raise unit 28. When unit 28 reaches the upper position LS 17 will be cycled to make the circuit to motor means 22 to move carriage 20 to its OUT position. This latter circuit is through normally closed contact 76f, contact 77b of LS 15 and solenoid 78a which sets valve 79 to move carriage 20 as desired. LS 13 is now set by the tight cable 25 to close normally open contact 13a, and when carriage 20 hits LS 14 in its OUT position it resets the circuit to actuate hoist motor 27 to lower the unit 28. The above described cycle of events is repeated when manual button 71 is pressed upon another layer of articles A being formed on the means F.

Figure 6:
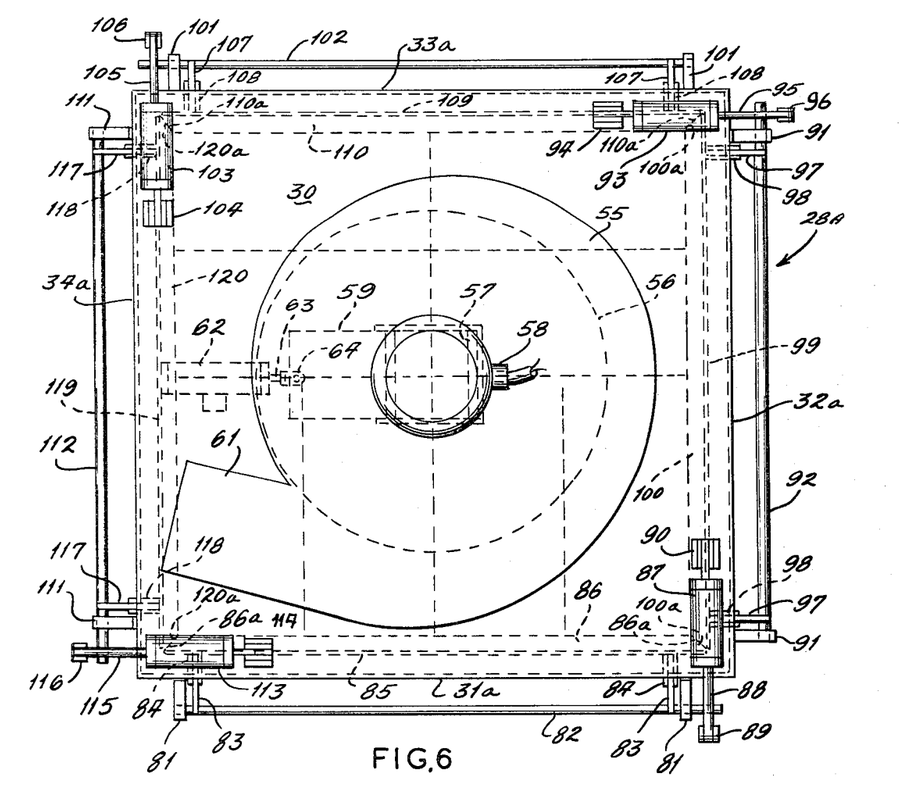
FIG. 6 is a top plan view of a modified article handling unit for FIG. 1.
Figure 7:
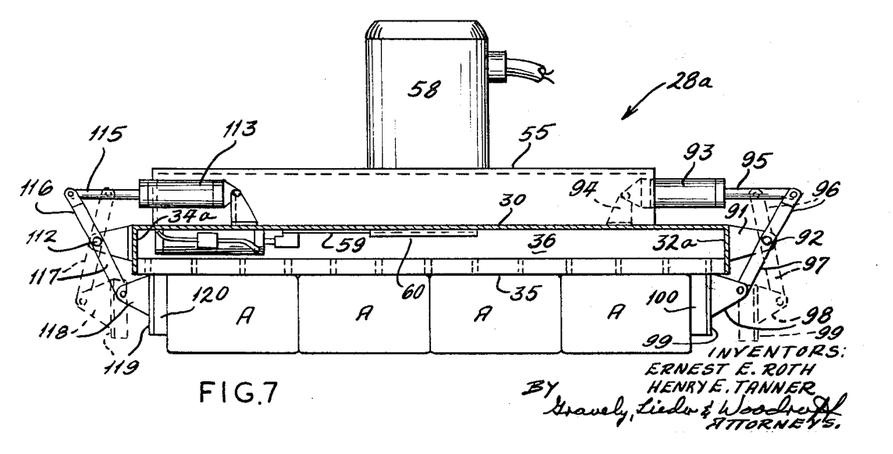
FIG. 7 is a side elevational view of the unit of FIG. 6.

Turning now to FIGS. 6 and 7 there is shown a modified unit 28A in which mechanically actuated means is substituted for the inflatable members 37 to 40 in FIG. 3. Where possible, previously described parts will be designated by similar reference numerals so that the modifications will be made to stand out. As shown, the unit 28A has a rigid top 30 as before, but the depending side walls 31a, 32a, 33a and 34a are shorter and extend downwardly only far enough to support the grid 35 which separate the articles A from the space 36 under the top 30.

The depending side 31a of the frame supports a pair of spaced bearing brackets 81 to carry a control shaft 82. The shaft 82 has a pair of actuating arms 83 which are connected to brackets 84 fixed on the back of a clamp member 85 which is elongated but shorter than side 31a. A facing material 86 is secured to the face side of member 85, and the ends of the facing are bevelled at 86a. The member 85 is moved about the axis of shaft 82 by fluid pressure motor means 87 having its rod 88 connected to a crank arm 89 which is fixed to one end of shaft 82. The motor means 87 has its base end pivotally attached to a bracket 90 secured to the top 30.

In a similar manner, wall 32a has spaced bearing brackets 91 for mounting rotary shaft 92 which is rotated by motor means 93 pivotally supported on bracket 94 on top 30. The rod 95 of motor means 93 connects to crank arm 96 for rotating shaft 92, and other arms 97 connect to brackets 98 on the back of elongated clamp member 99. A facing material 100 is secured to the face side of member 99, and the ends are bevelled at 100a. Likewise wall 33a has spaced bearing brackets 101 for mounting rotary shaft 102 which is rotated by motor means 103 pivotally supported on bracket 104 on top 30. The rod 105 of motor means 103 is connected to crank arm 106 for rotating shaft 102, and other arms 107 connect to brackets 108 on the back of elongated clamp member 109. A facing material 110 is secured to the face of member 109, and the ends are bevelled at 110a. Also in like manner, wall 34a has spaced bearing brackets 111 for mounting rotary shaft 112 which is rotated by motor means 113 pivotally supported on bracket 114 on top 30. The rod 115 of motor means 113 is connected to crank arm 116 for rotating shaft 112, and other arms 117 connect to brackets 118 on the base of elongated clamp member 119. A facing material 120 is secured to the face of member 119, and the ends thereof are bevelled at 120a.

Thus the several motor means 87, 93, 103 and 113 serve to actuate clamp members 85, 99, 109 and 119 respectively between the open dotted line positions indicated in FIG. 7 to the closed full line positions for compacting the layer of articles A. The facing material 86, 100, 110 and 120 on the respective clamp members is selected to have closed cell resilient characteristics so that it will conform to the irregularities of the articles A, and will not allow air leakage therethrough. Such material will afford a substantial seal about the perimeter of the layer of articles A, and the bevelled ends 86a–100a, 100a–110a, 110a–120a, and 120a–86a will abut to complete the enclosure of the articles A at the corners of the layer.

Figure 8:
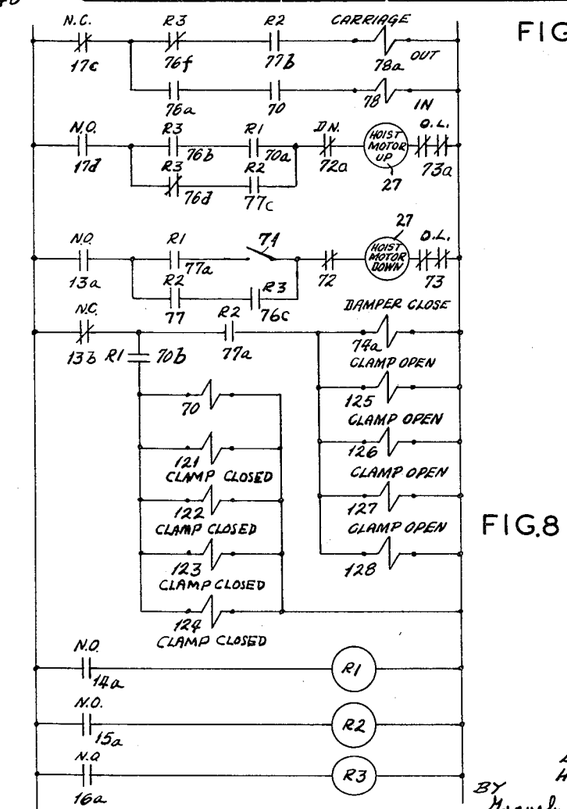
FIG. 8 is a wiring diagram for the apparatus when the unit of FIG. 6 is incorporated therein.

The operation of unit 28A is similar in most respects to the operation of unit 28, and the circuit diagram of FIG. 8 is similar to the circuit diagram of FIG. 5. The difference being in the control of the motor means 87, 93, 103 and 113. Each motor means is provided with solenoid controlled valve means (not shown) in which solenoids 121, 122, 123 and 124 are connected in parallel so as to be energized upon closing of contact 13b of LS 13 when the cables 25 go slack, and upon closing of contact 70a when LS 14 is closed by carriage 20 in the OUT position. Each motor means also has a second solenoid for controlling the same valve means to cause opening of the clamp members, such solenoids are shown at 125, 126, 127 and 128 respectively. To open the clamp members contact 13b of LS 13 and contact 77a of LS 15 must be closed so that the parallel circuits for the latter group of solenoids will be energized, and at the same time the blower valve 59 will be closed to cut off the vacuum within the unit 28A.

Figure 9:
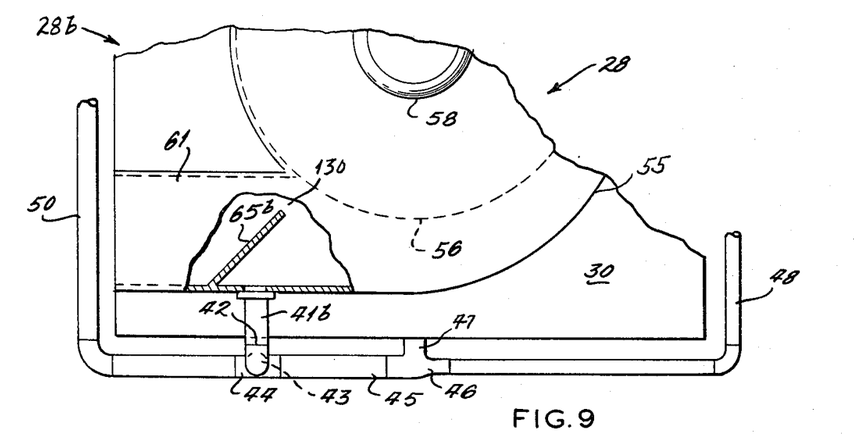
FIG. 9 is a fragmentary top view of a modified unit with parts shown in section.
Figure 10:
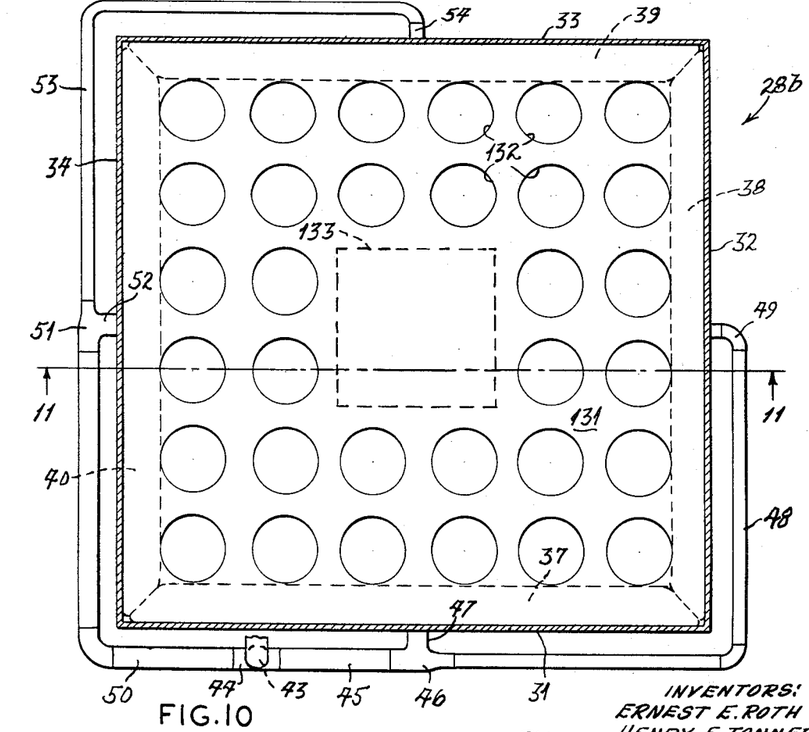
FIG. 10 is a top sectional view of the modified unit of FIG. 9.
Figure 11:
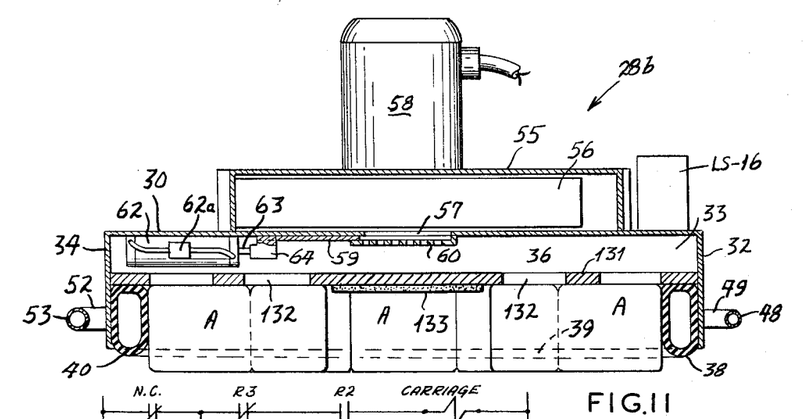
FIG. 11 is a sectional elevational view taken at line 11—11 in FIG. 10.

Turning now to FIGS. 9, 10 and 11 there is shown a further modification unit 28b. This modified unit is in most respects similar to unit 28 first described, and where applicable similar reference numerals will be applied. As may be seen in FIG. 9 the outlet 61 of the blower casing 55 is provided with an angularly turned fixed diverter wall 65b to replace the flip flop valve 65 or the valve 65a of FIG. 2A. The fixed wall 65b provides a by-pass opening 130 so that some of the air flow may be exhausted at outlet 61, and some of the flow will be directed into the conduit 41b. The conduit 41b is, as before shown, connected into the fitting 42 and thence to the conduits 45 and 50 for expanding the flexible members 37, 38, 39 and 40 within the shallow housing structure defined by top wall 30 and depending side walls 31, 32, 33 and 34. In this arrangement, when the inlet valve 59 for the blower is closed over opening 57 (FIG. 11) the suction effect will be cut-off. Thereafter the action of the blower will effect an evacuation of the flexible members 37 to 40 due to the flow of air through passage 130 at the free end of fixed wall 65b. Thus, the movable valves 65 or 65a are dispensed with.

Another modification exhibited in FIGS. 10 and 11 resides in the substitution for the previously described grid 35 of FIG. 2 of a wall or plate 131 having a plurality of openings 132. The plate 131 is also provided with a blank area 133 which is shown centered in the plate. A plug element 133 (FIG. 11) of closed cell resilient material is carried on the under side of the blank plate area. It is, of course, understood that the blank area of the plate may be located in some other place, or different plates 131 may be incorporated in the unit 28b. The purpose of having a blank area in plate 131 and a resilient plug element associated therewith is to take care of certain patterns of articles A where the shapes of the articles will form a void or gap when the articles are brought into a compact layer. Where a gap is thus present there must be means to plug the same so that the suction effect will not be lost. This characteristic of layering certain types and sizes of articles is well understood in the art.

It is, of course, understood from the foregoing forms of the present apparatus that the fixed wall 65b may be used with the unit 28 of FIG. 2, and the movable valve means 65 or 65a may be used in the unit 28b. It is also evident that the plate 131 may have an arrangement of openings 132 different from that illustrated in FIG. 10, or that the openings 132 may be of different sizes to more evenly distribute the suction effect produced upon blower operation. Since the grid 35 and plate 131 serve the same function they may be termed a spacer element.

The foregoing description relates to preferred forms of the present invention, but it will be understood that modifications and changes may be made in the various parts and components. It is, therefore, the aim and intent to include all possible equivalents within the scope of the appended claims.

What is claimed is:

1. In article loading and unloading apparatus the combination: of means to support a layer of articles in a predetermined pattern at a first station; other means to receive the layer of articles at a second station; and a lifting and conveying unit operable to compact and transport the layer of articles from said first station to said second station, said unit comprising a rigid top wall, depending fixed side walls adapted to at least partially surround the layer of articles in spaced relation about the periphery of the article layer, blower means on said top wall having an inlet communicating with the space enclosed by said side walls, an outlet remote from said enclosed space, said blower means producing a reduction of atmospheric pressure in said enclosed space above the layer of articles, resilient means operably carried by said side walls and movable to first positions engaging a substantial portion of the periphery of the layer of articles to form a substantial seal about the periphery of and concurrently compact the articles in said layer, said resilient means being movable to second positions releasing engagement with the periphery of the layer of articles, and fluid pressure supply means operably connected to said resilient means to cause movement thereof between said first and second positions.

2. The combination set forth in claim 1 wherein said fluid pressure means comprises conduit means connected between said blower outlet and said resilient means, said resilient means consists of inflatable members expanded by air from said blower outlet, and valve means to control selectively the flow of blower air to said conduit means and the exhaust of air therefrom respectively to inflate and deflate said members.

3. The combination set forth in claim 1 wherein said resilient means to seal the periphery of the articles comprises an expandable conduit carried by each of said side walls, each expandable conduit having a fixed wall portion and a movable wall portion extending along the articles, the movable wall portions of each conduit having opposite closed ends which in the said first positions of said resilient means abut adjacent closed ends of other movable wall portions to substantially seal the periphery of the article layer at the corners.

4. The combination set forth in claim 1 wherein said fluid pressure means includes a source of pressure fluid, a conduit system connected to said source of pressure fluid and to said resilient means consisting of hollow members having at least one expandable-collapsible wall, and valve means interposed in said conduit system to at times direct pressure fluid into said hollow members to expand the same and at other times to exhaust pressure fluid therefrom to collapse said members.

5. The combination set forth in claim 1 wherein said fluid pressure means comprises motor means operably connected to said resilient means, and said resilient means consists of clamp member having face surfaces and closed cell resilient material secured to the face surfaces thereof to engage the periphery of the article layer.

6. The combination set forth in claim 1 wherein said fluid pressure means comprises conduit means connected between said blower outlet and said resilient means, said resilient means consisting of inflatable members expanded by air from said blower outlet, and blower outlet air diverter means in said blower outlet positioned to at times direct air into said conduit means for inflating said members and at other times to aspirate air from said conduit means for deflating said members.

7. The combination set forth in claim 6 wherein said diverter means is a fixed wall having a free end forming an air by-pass in said blower outlet, and wherein valve means is positioned to open and close said blower inlet, closing of said inlet causing blower air to aspirate air from said conduit means for deflating said members.

8. A compacting and lifting unit for tiered article loading and unloading apparatus comprising: a frame having a top wall and depending side walls; a spacer element within said side walls and spaced from said top wall to provide a frame space; said frame cooperating with a tier of articles by having said spacer element engaged on the top surface of a tier of articles with the side walls spaced from the periphery of the tier of articles, said spacer element having openings therethrough; and means operably carried by said frame to conjointly compact the articles of a tier and lift the tier by a pressure drop through said spacer element and across the tier of articles wherein the frame space is at a substantially lower pressure than atmosphere, said means including a blower having an inlet communicating with said frame space and an outlet, elongated members at each depending side wall having relatively fixed and resilient surfaces with the resilient surfaces engageable with the periphery of the tier of articles, said elongated members meeting at the respective corners of the tier of articles, and fluid pressure means operably connected to said elongated members to operate the same.

9. A compacting and lifting unit according to claim 8 wherein said elongated members comprise hollow members in which said resilient surface is expandable and collapsible, and said fluid pressure means is a system of conduits connected to each of said hollow members and to said blower outlet, and there is means in said system to selectively control the admission of pressure fluid from said blower outlet to said hollow members and the exhaust of such fluid therefrom.

10. A compacting and lifting unit according to claim 8 wherein said elongated members comprise hollow members, each of whose fixed surface is connected to an adjacent side wall and each of whose resilient surface is expandable and collapsible substantially throughout its length, meeting of said members at the corners of the tier of articles being effected by the opposite ends of said resilient surfaces interengaging upon expansion of said members, thereby constituting a substantially continuous resilient surface about the periphery of the tier of articles.

References Cited

UNITED STATES PATENTS

| | | | |
|---|---|---|---|
| 3,054,521 | 9/1962 | Harris | 214—651 |
| 3,313,568 | 4/1967 | Fogg | 214—64 |

GERALD M. FORLENZA, *Primary Examiner.*

G. F. ABRAHAM, *Assistant Examiner.*